United States Patent
Kamel et al.

(10) Patent No.: US 7,302,989 B1
(45) Date of Patent: Dec. 4, 2007

(54) MODULAR MOLD SYSTEM WITH CERAMIC INSERTS

(75) Inventors: Ahmed Kamel, Orlando, FL (US); Jay E. Lane, Mims, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 0 days.

(21) Appl. No.: 11/447,732

(22) Filed: Jun. 6, 2006

(51) Int. Cl.
B22C 9/00 (2006.01)
(52) U.S. Cl. .................. 164/15; 164/516; 156/89.11
(58) Field of Classification Search .............. 164/15, 164/228, 368, 369, 516; 156/89.11
See application file for complete search history.

(56) References Cited

U.S. PATENT DOCUMENTS

| 3,095,316 | A |   | 6/1963  | Hartwig |
|-----------|---|---|---------|---------|
| 4,202,522 | A |   | 5/1980  | Hanas et al. |
| 4,425,407 | A |   | 1/1984  | Galasso et al. |
| 4,434,835 | A | * | 3/1984  | Willgoose ............ 164/34 |
| 4,560,589 | A |   | 12/1985 | Endou et al. |
| 5,462,800 | A |   | 10/1995 | Yamazaki et al. |
| 5,731,014 | A |   | 3/1998  | Travaglini |
| 6,152,211 | A |   | 11/2000 | Klug et al. |
| 6,410,088 | B1 |  | 6/2002  | Robin-Brosse et al. |
| 6,627,019 | B2 | * | 9/2003 | Jarmon et al. ......... 156/89.11 |
| 6,776,214 | B2 |  | 8/2004  | Ray et al. |
| 6,776,936 | B2 |  | 8/2004  | Hardcastle et al. |
| 6,881,262 | B1 |  | 4/2005  | Haerle et al. |
| 6,896,036 | B2 |  | 5/2005  | Schneiders et al. |
| 2005/0006047 | A1 | | 1/2005 | Wang et al. |
| 2005/0156361 | A1 | | 7/2005 | Holowczak et al. |

FOREIGN PATENT DOCUMENTS

| EP | 1452624 A2 | 9/2004 |
|----|-----------|--------|
| GB | 809133    | 4/1956 |
| JP | 60147503 A | 8/1985 |
| JP | 06134713 A | 5/1994 |

* cited by examiner

*Primary Examiner*—Jonathan Johnson
*Assistant Examiner*—I.-H. Lin

(57) ABSTRACT

A mold system for producing components of a turbine engine. The mold system may enable a configuration of a turbine engine component to be changed in less time than conventional systems. The mold system may include a mold formed from mold plates wherein at least one of the mold plates has at least one mold cavity configured to receive a ceramic insert and a ceramic insert positioned in the at least one mold cavity and including a core making cavity. The ceramic insert may be formed from a material having high compressive strength, good wear resistance, good corrosion resistance, good thermal conductivity, and high toughness, such as but not limited to, graphite partially or fully converted to silicon carbide, silicon carbide, graphite coated with silicon carbide, and other appropriate materials. The ceramic insert may also be formed with other near net shape processes, such as, reaction bonded metal oxides.

6 Claims, 2 Drawing Sheets

MODULAR MOLD SYSTEM WITH CERAMIC INSERTS

FIELD OF THE INVENTION

This invention is directed generally to modular mold systems, and more particularly to building molds for creating parts for turbine engines.

BACKGROUND

Typically, turbine airfoils usable in turbine engines include a plurality of internal cooling passages. These cooling passages are typically formed with a ceramic core. Ceramic cores are often formed with molding systems, such as those typically used in the plastics injection molding industry; however, for turbine parts more wear-resistant metal alloys are needed for the molding systems to withstand the abrasive ceramic slurries that are typically used to form the ceramic cores. The molding systems typically comprise mold plates and a cavity space within the mold plates. The mold cavity space defines the ceramic core shape, dimensions and features, including the complex cooling passages common to turbine airfoils.

Two general methods exist for making the mold cavities. The first method involves creating the cavity space by removing material from the mold plates. Because the mold plates are made from wear-resistant metal alloys, conventional machining of these plates is extremely difficult, expensive, time consuming, and is also limited to machining simple mold cavity geometries. Typically, non-conventional metal removing methods, such as electrical discharge machining (EDM) or chemical etching are needed to create the cavity space that forms the ceramic core.

The second method of creating the mold cavity shape involves the use of a metal insert that has an internal cavity shape. This metal insert is placed into a space machined into the mold plates. The approach allows the use of lower cost and easier to machine metals for the mold plates and limits the use of wear-resistant metal alloys to the metal inserts. However, as with the first method, this approach requires non-conventional, expensive and time consuming metal removal methods to create the cavity shape within the metal insert.

These two conventional methods of creating a ceramic core molding system typically take about sixteen to twenty weeks to complete. In an attempt to reduce lead-time and allow for design changes, less wear resistant and easier to machine alloys have been used as metal inserts. However, these materials have a very limited life due to their lower wear resistance and need to be replaced often, which adds extra cost to the ceramic core making process. Once the design changes are completed, an additional four to six weeks are needed to make the insert from a wear-resistant metal alloy. Therefore, a need exists for a more time efficient and lower cost process of producing a ceramic core usable in the production of a turbine airfoil.

SUMMARY OF THE INVENTION

This invention is directed to a mold system configured to producing components of a turbine engine. In particular, the mold system may be configured to produce ceramic cores usable to create internal cooling systems of a turbine airfoil. The mold system may enable a configuration of a turbine engine component to be changed, such as in a design iteration, in less time than conventional systems. In particular, the mold system may facilitate use of a rapid prototype tooling process for the fabrication of inserts.

The mold system may include a mold formed from at least one mold plate having at least one mold cavity configured to receive an insert. The mold may be configured to be used in injection molding, transfer molding, or in other appropriate applications. The insert may be configured to be positioned in the at least one mold cavity. The insert may include a core making cavity for creating a ceramic core. The insert may be formed from a ceramic material having high compressive strength, good wear resistance, good corrosion resistance, smooth dense surface, good thermal conductivity, and high toughness. Ceramic materials meeting these requirements include, but are not limited to, graphite converted into silicon carbide (SiC), silicon carbide, graphite coated with silicon carbide, other hard ceramic carbides and nitrides, aluminum oxide, other hard ceramic oxides and other appropriate materials. The insert may also include a coating for sealing the insert. In at least one embodiment, the coating may be formed from a chemical vapor deposition of a nonporous material, such as, but not limited to, silicon carbide.

The mold system may also include a method of producing a ceramic core usable in production of a turbine airfoil. The method may include building a mold plate having at least one mold cavity configured to receive an insert, installing an insert in the at least one mold cavity, wherein the insert and the mold plate may form at least a portion of a ceramic core mold, and injecting a ceramic slurry into the ceramic core mold to create a ceramic core. Installing the insert in the at least one mold cavity may include installing a ceramic insert fully or partially formed from silicon carbide. The insert may include a coating formed from a chemical vapor deposition of a nonporous material, which may be silicon carbide. The ceramic insert may be formed from a net shape process, such as, but not limited to, an insert formed from a reaction bonded metal oxide.

In order to achieve the time advantages, lower costs, and/or rapid design change turnaround, the ceramic insert needs to be able to be formed from a rapid near net shape process. The preferred starting material for such a process is graphite, which is soft and easy to machine. Graphite is also preferred for making the complex shape ceramic inserts typically needed for making complex ceramic cores that are needed for making the complex cooling passages in gas turbine blades. The preferred process is high speed machining of graphite which should then be either fully converted into SiC and surface coated, partially converted into SiC and surface coated, or surface coated with SiC. Graphite should be converted to SiC and/or coated with SiC because graphite is too soft to withstand the abrasive ceramic slurries that are typically used to make ceramic cores. This graphite-based process may take about one to two weeks to make the insert.

Additionally, during component development when design changes are completed, the insert can also be used for production because it is a hard erosion resistant ceramic. Time need not be wasted on producing a production caliber insert. This is in contrast to the current conventional processes that would require an additional four to six weeks to make an insert from a wear-resistant metal alloy.

Other near net shape processes for making ceramic inserts include reaction bonded metal oxide (RBMO) processes, such as used to make reaction bonded aluminum oxide (RBAO); reaction bonded or reaction sintered silicon carbide processes; and reaction bonded silicon nitride processes. Other ceramic oxide, carbide and nitride compositions may be made using similar processes. Additionally, net shape ceramic inserts may be made by rapid prototyping processes, such as selective laser sintering, three-dimensional printing and other such methods known to those skilled in the art. These processes though would be capable of making less complex near net shape ceramic inserts. The graphite based process would be preferred for complex shape ceramic inserts.

An advantage of this invention is that the lead time for making a mold with a ceramic insert is about four to six weeks, which is substantially less than conventional molding systems with wear-resistant metal alloys that are typically about sixteen to twenty weeks.

Another advantage of this invention is that the invention increases the ability of a design to be altered during production without significantly affecting the cost or the timeline of production of a component.

Yet another advantage of this invention is that this invention is capable of producing low volumes quickly for prototype analysis and at low cost.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
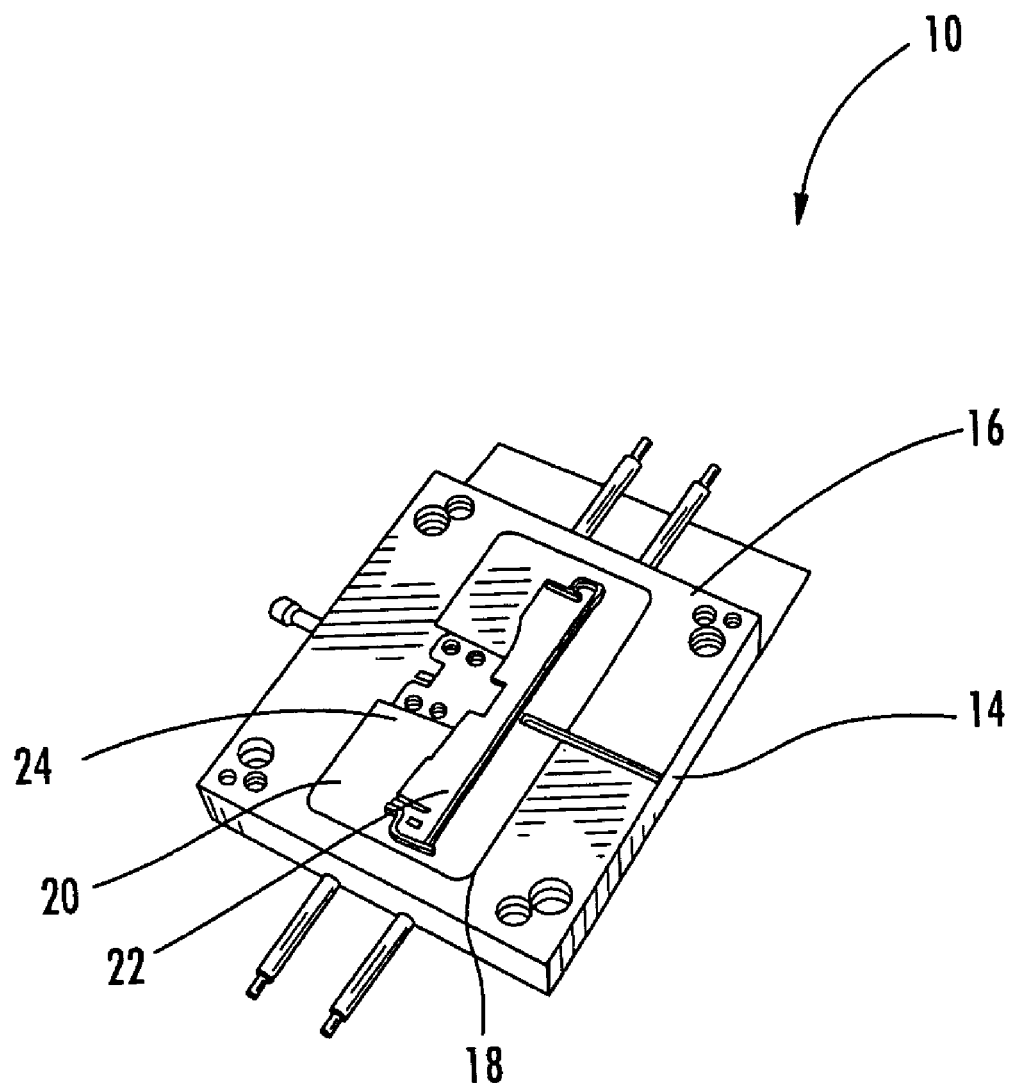
FIG. 1 is a perspective view of a mold including an insert of the invention.
Figure 2:
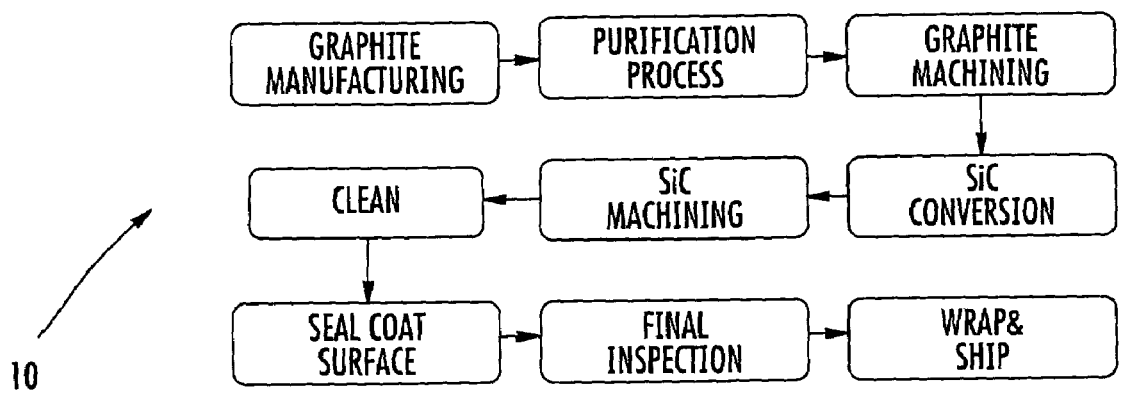
FIG. 2 is schematic diagram of a process for forming an insert usable in the invention.

As shown in FIGS. 1-2, the invention is directed to a mold system 10 configured to producing components of a turbine engine. The mold system 10 may enable a configuration of a turbine engine component to be changed in less time than conventional systems. In particular, the mold system 10 facilitates use of a rapid near net shape process for the fabrication of components, such as, but not limited to, ceramic cores usable in the manufacture of turbine airfoils. The mold system 10 may include a mold 14 formed from at least one mold plate 16 having at least one mold cavity 18 configured to receive a ceramic insert 20. The mold system 10 may include one or more mold plates 16. The mold system 10 may include a ceramic insert 20 configured to be positioned in the at least one mold cavity 18. The ceramic insert 20 may include a core making cavity 22. The ceramic insert 20 may be formed from a ceramic material having high compressive strength, good wear resistance, good corrosion resistance, smooth dense surface, and high toughness. The insert 20 may also be formed with other near net shape processes, such as, reaction bonded metal oxides, such as reaction bonded aluminum oxide and reaction bonded silicon carbide.

As shown in FIG. 1, the mold system 10 may include a mold 14. The mold 14 may be formed to be usable with injection molding processes, transfer molding processes, and other appropriate processes. The mold 14 may be formed with materials such as, but not limited to, soft steels, such as P20 or NAK55, aluminum, aluminum-epoxy, and other appropriate materials. Materials such as abrasive resistant steels are not preferred because such materials are difficult to machine and require EDM processes. Such materials also increase the lead time for producing the mold 14.

The mold 14 may include the mold cavity 18 for receiving the insert 20. The mold cavity 18 may have any configuration capable of retaining the insert 20 within the mold 14. In at least one embodiment, the mold cavity 18 may be sized to be about the same size as outer dimensions of the insert 20. In another embodiment, the insert 20 may form an interference fit with the mold cavity 18.

The mold system 10 may also include the insert 20. The insert 20 may be formed using any net shape process. The insert 20 may be formed from a material that may be easily worked into a finished shape to reduce lead times in creating a mold 14. Thus, the insert 20 may reduce the time needed to complete a design iteration for a ceramic core produced using the mold 14 as compared to conventional methods. The insert 20 may be formed from ceramic materials such as, but not limited to, graphite that is partially or fully converted to silicon carbide, graphite coated with silicon carbide, and other appropriate materials. The insert 20 may be configured to be formed in a desired shape for producing at least a portion of the component for a turbine engine. The insert 20 may be formed starting with graphite, as shown schematically in FIG. 2, using high speed milling processes. The graphite may be converted into a silicon carbide using a process offered by Poco Graphite, Inc. of Decatur, Tex. In particular, computer aided drafting (CAD) software may be used to assist in milling the insert 20. The graphite may be converted into silicon carbide without altering the shape or purity of the insert 20. The conversion process is a net shape process. Any debris remaining on the surface of the insert 20 after the conversion process has been completed may be removed using grit blasting. It is desirable that the insert 20 have smooth surfaces in order to generate good casting components. The graphite has open porosity, which allows for infiltration of silicon monoxide (SiO) gas into the graphite for chemical conversion of the graphite to silicon carbide. The resulting insert 20 is a silicon carbide ceramic insert 20 with a porous surface.

The porous surface of the insert 20 may be sealed in at least two ways. A surface of the insert 20 may be sealed with a coating 24. The coating 24 may be formed from a chemical vapor deposition (CVD). The coating 24 may be formed from silicon carbide. The silicon carbide coating 24 may form a dense coating. The thickness of the coating 24 may be adjusted to meet the application requirements. In another embodiment, the graphite may be sealed with a pyrolytic carbon using a process developed by Poco Graphite, Inc. of Decatur, Tex. The graphite may then be converted to silicon carbide as previously described. The graphite may then be sealed with a coating 24, which may be silicon carbide. This embodiment produces a ceramic insert 20 having a higher density with increased mechanical properties, increased thermal conductivity, and better adhesion of the coating 24 to the silicon carbide relative to the embodiment previously discussed.

The insert 20 may be formed using other methods as well. For instance, the insert 20 may be formed by placing the coating 24 on the graphite insert 20 without first converting the graphite to silicon carbide. In another embodiment, not all of the graphite layers forming the insert 20 need to be converted to silicon carbide. Instead, less than all of the graphite forming the insert 20 may be converted to silicon carbide. For instance, in at least one embodiment, the graphite forming the insert 20 may only have an outer surface converted to silicon carbide. The insert 20 may then be covered with a coating 24 of silicon carbide. In yet another embodiment, a dense graphite, such as, but not limited to, POCO EDM-AF5, may be used to create the insert 20. The insert 20 may then be coated with a coating 24, which may be silicon carbide. In another embodiment, the insert 20 may be formed from a dense graphite. The outer surface of the insert 20 may be converted to silicon carbide. A coating 24 of silicon carbide may be applied if needed to improve surface roughness to be within a range of between about 63 μin and 125 μin.

The insert 20 may also be formed using a reaction bonded silicon carbide. In this process, silicon carbide powder of an appropriate average particle size may be mixed with a multicomponent binder. Using a rapid prototyping process, such as selective laser sintering, a solid free form of the insert may be created (which may also be referred to as a green part). The green part may then be placed in a vacuum furnace to carbonize the binder and convert the green part into silicon carbide.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A method of producing a ceramic core usable in production of a turbine airfoil, comprising:
    machining a workable material into a ceramic insert having at least one core making cavity;
    increasing the durability of the ceramic insert;
    forming a mold plate having at least one mold cavity configured to receive a ceramic insert;
    installing the ceramic insert in the at least one mold cavity, wherein the ceramic insert includes the at least one core making cavity, and the mold plate forms at least a portion of a ceramic core mold; and
    injecting a ceramic slurry into the ceramic core mold to create a ceramic core, wherein increasing the durability of the ceramic insert comprises converting a ceramic insert formed from graphite at least partially into silicon carbide.

2. The method of claim 1, wherein installing a ceramic insert in the at least one mold cavity comprises installing a ceramic insert formed from a reaction bonded metal oxide.

3. The method of claim 1, wherein increasing the durability of the ceramic insert comprises adding a coating formed from a chemical vapor deposition of silicon carbide into the ceramic insert.

4. The method of claim 1, wherein installing the ceramic insert in the at least one mold cavity comprises installing a ceramic insert formed from silicon carbide.

5. The method of claim 4, wherein installing the ceramic insert formed from silicon carbide comprises installing a ceramic insert having a coating formed from a chemical vapor deposition of a nonporous material.

6. The method of claim 5, wherein installing a ceramic insert formed from silicon carbide comprises installing a ceramic insert having a coating formed from a chemical vapor deposition of silicon carbide.

* * * * *